United States Patent [19]
Pitt et al.

[11] Patent Number: 4,637,071
[45] Date of Patent: Jan. 13, 1987

[54] OPTICAL ACTUATOR

[75] Inventors: Gillies D. Pitt, Saffron Walden; David N. Batchelder, London; Roger E. Jones, Little Shelford; Rosamund C. Neat, London, all of England

[73] Assignee: International Standard Electric Corporation, New York, N.Y.

[21] Appl. No.: 675,677

[22] Filed: Nov. 28, 1984

[30] Foreign Application Priority Data

Nov. 30, 1983 [GB] United Kingdom ............... 8331952

[51] Int. Cl.$^4$ ............... H04B 9/00; F16K 31/00; F16K 31/18
[52] U.S. Cl. ............... 455/603; 137/828; 251/11; 455/612; 455/619
[58] Field of Search ............... 455/603, 614, 600, 612, 455/619, 620; 137/827, 828; 251/11

[56] References Cited

U.S. PATENT DOCUMENTS

| | | | |
|---|---|---|---|
| 1,779,228 | 10/1930 | Ellberg et al. | 251/11 |
| 1,881,964 | 10/1932 | Persons | 251/11 |
| 2,077,735 | 4/1937 | Beckler | 251/11 |
| 2,769,312 | 11/1956 | Herrold et al. | 251/11 |
| 3,414,231 | 12/1968 | Kreuter | 251/11 |
| 4,372,486 | 2/1983 | Tomioka et al. | 251/11 |
| 4,512,371 | 4/1985 | Drzewiecki et al. | 137/828 |
| 4,538,633 | 9/1985 | Stevens | 251/11 |

FOREIGN PATENT DOCUMENTS 2639822 12/1977 Fed. Rep. of Germany ...... 455/619

Primary Examiner—Joseph A. Orsino, Jr.
Attorney, Agent, or Firm—John T. O'Halloran; Robert P. Seitter

[57] ABSTRACT

An arrangement for the remote actuation of a controlled device, e.g. a hydraulic valve, in situations with stringent safety requirements, uses optical power. The optical power, e.g. from a high-power laser, is conveyed via an optical fibre (1) to the controlled device. Here it falls on a heat-absorbent surface (2), as a result of which a volatile fluid (e.g. freon) is evaporated. This via a bellows (4) drives an output rod (5), which operates the controlled device.

Alternatives include a bimetallic strip, a thermostat-type capsule, and a memory metal strip, as the heat responsive device.

4 Claims, 4 Drawing Figures

OPTICAL ACTUATOR

This invention relates to remotely operable actuators, where the devices use optical techniques.

There is a requirement, especially in the offshore oil industry for the remote operation of valves or other devices. Where, as is the case in the oil industry, intrinsic safety requirements are in force such actuation is usually done electrically using a very small amount of electrical power to actuate a pilot valve which then diverts hydraulic power to operate a larger valve or other device.

An interesting example of prior art is to be found in Norwegian Pat. No. 14441 (STK; D. Poppe 7) which describes a method for heating a small component, in which optical energy is transferred from a remote optical source via at least one optical fibre to the component to be heated so that at least a portion of the optical energy is converted into heat energy in the component. In the arrangement described the component to be heated is the detector element of a liquid level sensor, especially for the case where a liquid whose level is to be sensed is inflammable.

In the prior Patent, the energy to be conveyed is intended solely for the performance of a detecting function. Hence efficiency of power transfer is of no significance.

An object of the present invention is to extend the principles inherent in the above-identified Norwegian Patent to the remote operation of a mechanical device.

According to the invention there is provided a remotely-controlled actuator, which includes an input connection formed by an optical fibre over which optical power is received when the actuator is in use, a member aligned with the optical fibre so that light energy received via said fibre causes heating thereof, which member is responsive to the heating caused by said incident optical power to cause a movement of a controlled device, and an output member associated with the controlled device which is operated by said controlled device and whose movement provides the desired actuation.

Thus it will be seen that we have appreciated that useful amounts of power can be transmitted via an optical fibre from a light source to a device to be controlled. Several forms of actuator have been described, as will be seen from the ensuing description. Thus a volatile liquid may be caused to vapourise due to heat generated by the optical power, such as to move a diaphragm. Another variant related to this is to cause a gas to expand due to such heat to close up a bellows-type device. Yet another variant uses a memory metal strip, while another device uses a snap-action device which snaps over under heat from the optical fibre.

Embodiments of the invention will now be described with reference to the accompanying drawings, in which FIG. 1 shows schematically an embodiment of the invention in which the optical radiation heats a volatile liquid.

Figure 1:
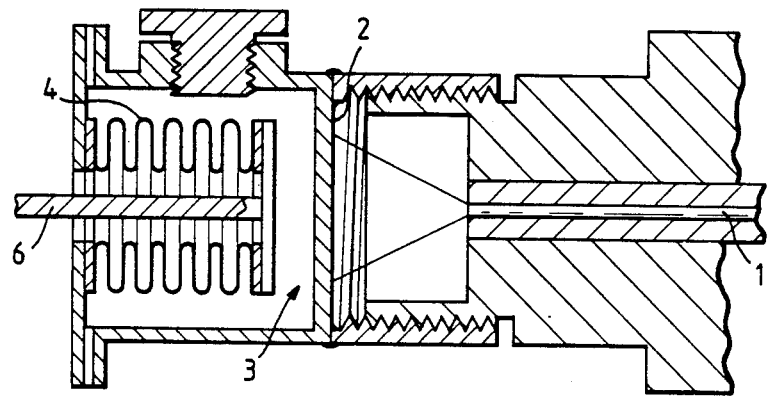

In FIG. 1, an optical fibre 1 conveys the optical radiation, which may be infra-red, to the device. As the radiation leaves the end of the fibre, it fans out, as shown, and is incident on a matt-black surface 2 on one wall of a chamber 3 which contains a volatile liquid such as a freon (e.g. $CH_2FI$). This chamber, which is completely sealed, has a bellows 4, and the freon is placed in the chamber via the filler plug 5.

When an optical actuation signal arrives over the fibre 1, it heats the wall 2 with the matt-black surface, as a result of which the contents of the chamber 3 expand. Hence the bellows are contracted to cause movement of the rod 6. This acts as an actuator for a controlled device such as a hydraulic valve. When the signal ends and the heated freon cools down, the resilience of the bellows resets the device.

Figure 2:
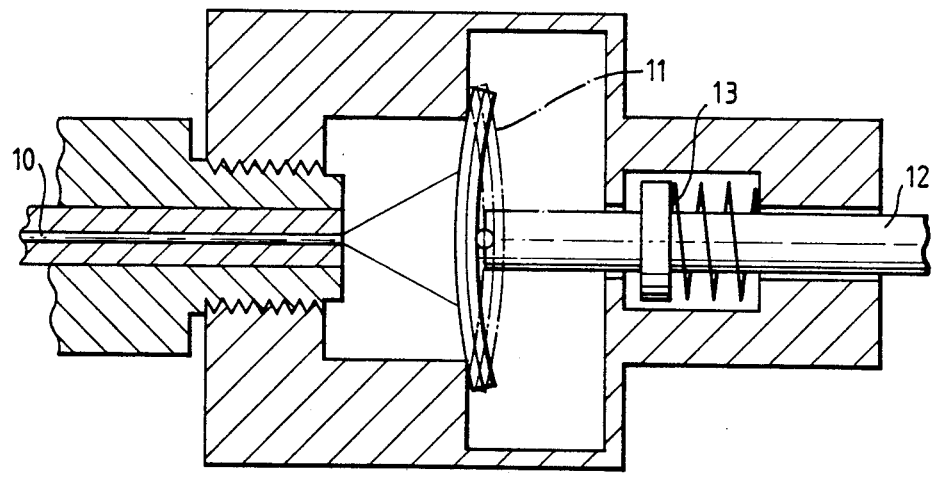
FIG. 2 shows schematically an embodiment of the invention using a bimetallic strip as the heat responsive member.

In the device shown in FIG. 2, optical power received via an optical fibre 10 falls on a bimetallic strip 11, and the heating causes this strip to snap over to a position indicated in dotted lines. Hence an actuator rod 12 is driven rightward to provide the output of the device. Here the resetting action is provided by a return spring 13 which embraces the rod 12.

Figure 3:
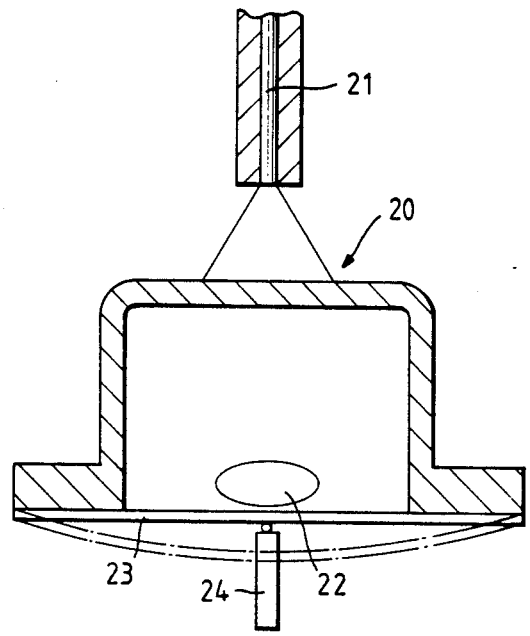
FIG. 3 shows schematically another arrangement in which a volatile liquid is evaporated by the heat.

In the device shown in FIG. 3, the radiation responsive member is a capsule which is similar in many respects to that described and claimed in our Pat. No. 2048473B (T. M. Jackson—R. J. Hodges—M. J. Wild 64-40-5). This capsule has a heat-absorbent surface 20, e.g. matt-black, on which radiation from the optical fibre 21 falls. The capsule contains a small quantity of a freon, indicated schematically at 22, which evaporates when heated by the incident radiation. This evaporation causes a diaphragm 23, which closes the capsule, to bulge outwards, as indicated in the dashed line, and this movement drives the controlled device via an actuating rod 24. Restoration to rest is at least part effected by the external air pressure on the diaphragm when the freon cools down.

Figure 4:
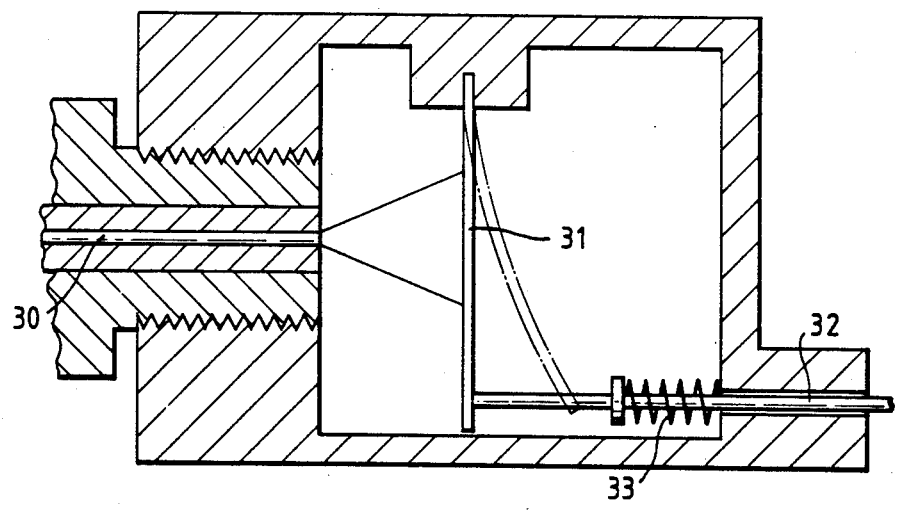
FIG. 4 shows an arrangement generally similar in principle to that of FIG. 2, but using a strip of a memory metal.

In the device shown in FIG. 4, radiation from the optical fibre 30 falls on a memory metal strip 31. This responds when enough heat has been applied to it to snap over to the position shown in dashed lines. Hence an actuator rod 32 is driven rightwards to effect the desired operation. Restoration to rest is by a return spring 33.

All of the devices described above take advantage of the fact that optical fibres are available which can pass relatively high power, e.g. derived from a neodymium-YAG laser which can send up to 200 watts down an optical fibre.

We claim:

1. A remotely-controlled actuator, which includes:
   an input connection formed by an optical fiber over which optical power is received when the actuator is in use;
   a cell aligned with said optical fiber and having a heat absorbent surface adjacent said optical fiber so that said surface is heated in response to light energy received via said optical fiber falling on said surface, said cell further having a diaphragm forming a wall thereof which closes the cell;
   a volatile liquid within said cell which evaporates upon said surface being heated to cause said diaphragm to bulge outwardly in a first direction, said diaphragm being returnable to its initial position by moving in a second direction when said evaporated liquid cools down; and a rod fixed to the outer surface of said diaphragm which moves in said first direction when said diaphragm bulges in said first direction and in said second direction when said diaphragm returns to said initial position in said second direction.

2. An actuator according to claim 1 wherein said surface is an outer surface of a wall of said cell which is heated by said light energy and heat is transmitted through said wall to said volatile liquid.

3. An actuator according to claim 2 wherein said outer surface is a matt-black surface.

4. An actuator according to claim 3 wherein said volatile liquid is freon.

* * * * *